US005253060A

United States Patent [19]
Welmer et al.

[11] Patent Number: 5,253,060
[45] Date of Patent: Oct. 12, 1993

[54] VIDEO SIGNAL PROCESSING SYSTEM WITH NETWORKED CONTROL OF ASPECT RATIO CONVERSION WITHIN THE SYSTEM

[75] Inventors: Harm J. Welmer, Sutton, Netherlands; Bernard van Steenbrugge, Redhill, England

[73] Assignee: D2B Systems Company Limited, Redhill, United Kingdom

[21] Appl. No.: 804,578

[22] Filed: Dec. 10, 1991

[30] Foreign Application Priority Data

Dec. 21, 1990 [GB] United Kingdom ............ 9027840.9

[51] Int. Cl.[5] .......................... H04N 5/46; H04N 7/01
[52] U.S. Cl. ...................................... 358/140; 358/160
[58] Field of Search ................. 358/11, 140, 142, 180, 358/160, 83, 141

[56] References Cited

U.S. PATENT DOCUMENTS

| | | | |
|---|---|---|---|
| 4,472,731 | 9/1984 | Van Gurp et al. ................... 358/11 |
| 4,884,138 | 11/1989 | Storey ............................. 358/140 X |
| 4,903,125 | 2/1990 | Parker ............................. 358/140 X |
| 4,905,167 | 2/1990 | Yamaoka et al. ................... 358/140 |
| 4,933,749 | 6/1990 | Van Lammeren et al. ....... 358/11 X |
| 4,984,081 | 1/1991 | Miyoshi et al. ................... 358/180 |
| 5,023,717 | 6/1991 | Lamnabhi et al. ................ 358/140 |
| 5,124,792 | 6/1992 | Shimaoka ........................... 358/140 |
| 5,136,369 | 8/1992 | Bohme et al. ...................... 358/11 |

*Primary Examiner*—Mark R. Powell
*Attorney, Agent, or Firm*—Michael E. Marion

[57] ABSTRACT

A domestic video system includes a number of interconnected video apparatuses (10,12,14), at least one of the apparatuses including a facility for conversion of the aspect ratio of video signals. The system further includes control signalling (20) operating via a standard serial bus (16) for systematically interrogating each apparatus in a signal path to determine whether aspect ratio conversion is necessary in the signal path and for selectively enabling or disabling any conversion facility in the signal path to effect such necessary conversion. The control means implements a strategy for eliminating unnecessary conversion of aspect ratio in the signal path, and also chooses to effect conversion as late as possible in the signal path when faced with more than one available conversion facility.

20 Claims, 2 Drawing Sheets

VIDEO SIGNAL PROCESSING SYSTEM WITH NETWORKED CONTROL OF ASPECT RATIO CONVERSION WITHIN THE SYSTEM

BACKGROUND OF THE INVENTION

The invention relates to a video signal processing system comprising a plurality of video signal processing apparatuses, at least one of the apparatuses including a facility for conversion of the aspect ratio of video signals, the apparatuses being connected so as to provide a video signal path from a source one of the apparatuses to a destination one of the apparatuses.

The invention further relates to a video signal processing apparatus for use in such a system.

Conventional television and video systems (for example PAL, SECAM, NTSC) operate with a picture aspect ratio of 4:3, but widescreen formats such as MAC, PAL plus and MUSE are available or proposed which have a 16:9 aspect ratio. For some years during a transition to widescreen systems there will be a need for conventional 4:3 picture signals to be converted for display on new widescreen display apparatus, and for new widescreen picture signals to be converted for display on conventional 4:3 display apparatus.

Facilities for such conversion can be provided within the television set or video monitor, within a VCR, within a satellite broadcast tuner or other special equipment. However, with presently proposed equipment, it is left to the user to sort out which conversions are required for the receivable signals for a given combination of apparatus, leading to a very user-unfriendly system. Even when the user has a relatively straightforward system in which a satellite receiver for widescreen transmissions simply provides a converted conventional 4:3 signal to subsequent elements such as VCR and television, problems will arise when, at a later date, the user upgrades to a widescreen version of one or both of these latter two components. The user then has to disable the conversion in the satellite tuner, (if possible) leading again to user-unfriendliness and perhaps expense. With a VCR, even more confusion can arise if the user has to decide whether a signal needs to be converted during recording, playback or both, and whether the conversion is to be (can be) performed in the television set, the VCR, the satellite tuner and so forth.

SUMMARY OF THE INVENTION

It is an object of the invention to provide an video signal processing system in which any necessary conversions between different aspect ratios can be provided in an optimum and user-friendly manner.

The invention provides a system as set forth in the opening paragraph, characterized in that the system further comprises control means for systematically interrogating each apparatus in the signal path to determine whether aspect ratio conversion is necessary in the signal path and for selectively enabling or disabling the or each aspect ratio conversion facility in the signal path to effect such necessary conversion. By providing for the automatic determination of aspect ratio conversion requirements in a given signal path, the system relieves the user of concern about aspect ratio compatibility, and may select an optimised conversion scheme, for each new signal path as it is established.

For example, the control means may implement a strategy for eliminating unnecessary conversion of aspect ratio in the signal path, to avoid excessive degradation in signal quality.

The control means may implement a strategy for choosing to enable conversion as late as possible in the signal path when faced with more than one available conversion facility. Such a strategy has the advantage that the originally received signal is available in the system in its original aspect ratio as long as possible, therefore automatically reducing the likelihood of redundant aspect ratio conversion. In any event a self-consistent strategy can be adopted for maximum efficiency and compatibility between equipment.

The control means may include means for transmitting predefined request and command messages to the apparatuses via a standard serial bus having distributed control. Such a bus is described for example in the Domestic Digital Bus (D2B) standard. GB-A-2 223 114 (PHN 12678) describes the use of such a bus for establishing a signal path in an audio/video entertainment system, and the apparatus may further include means for identifying the signal path, which means also includes means for transmitting messages via the standard serial bus accordingly.

The invention further provides a video signal processing apparatus for use in a system in accordance with the invention as set forth above, the apparatus including control means for initiating the systematic interrogation of the connected apparatuses to determine whether aspect ratio conversion is necessary in the signal path. Further control of the interrogation, and the selective enabling or disabling of each aspect ratio conversion facility in the signal path may also be controlled by the same control means, acting as a master on the bus, or the tasks can be distributed between control means within several of the apparatuses, each acting as master for a different part of the operation.

The control means within the apparatus may include an interface to a standard serial bus having distributed control, and means for transmitting and receiving a sequence of messages via the bus interface to initiate the systematic interrogation of connected apparatuses.

The control means may be responsive automatically to the establishment of a new signal path, and/or to a change of status in the source apparatus to initiate said systematic interrogation.

The invention still further provides video signal processing apparatus for use in a system in accordance with the invention as set forth above, the apparatus including an interface to a standard serial bus and further including means for responding to a predefined request message received via the bus interface by transmitting a reply message identifying the aspect ratio of a video signal within the apparatus at a point specified in the request message.

The apparatus may further include means for responding to a predefined request message received via the bus interface by transmitting a reply message indicating whether an aspect ratio conversion facility exists within the apparatus or a specified part thereof and if so whether the facility is currently enabled or disabled.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
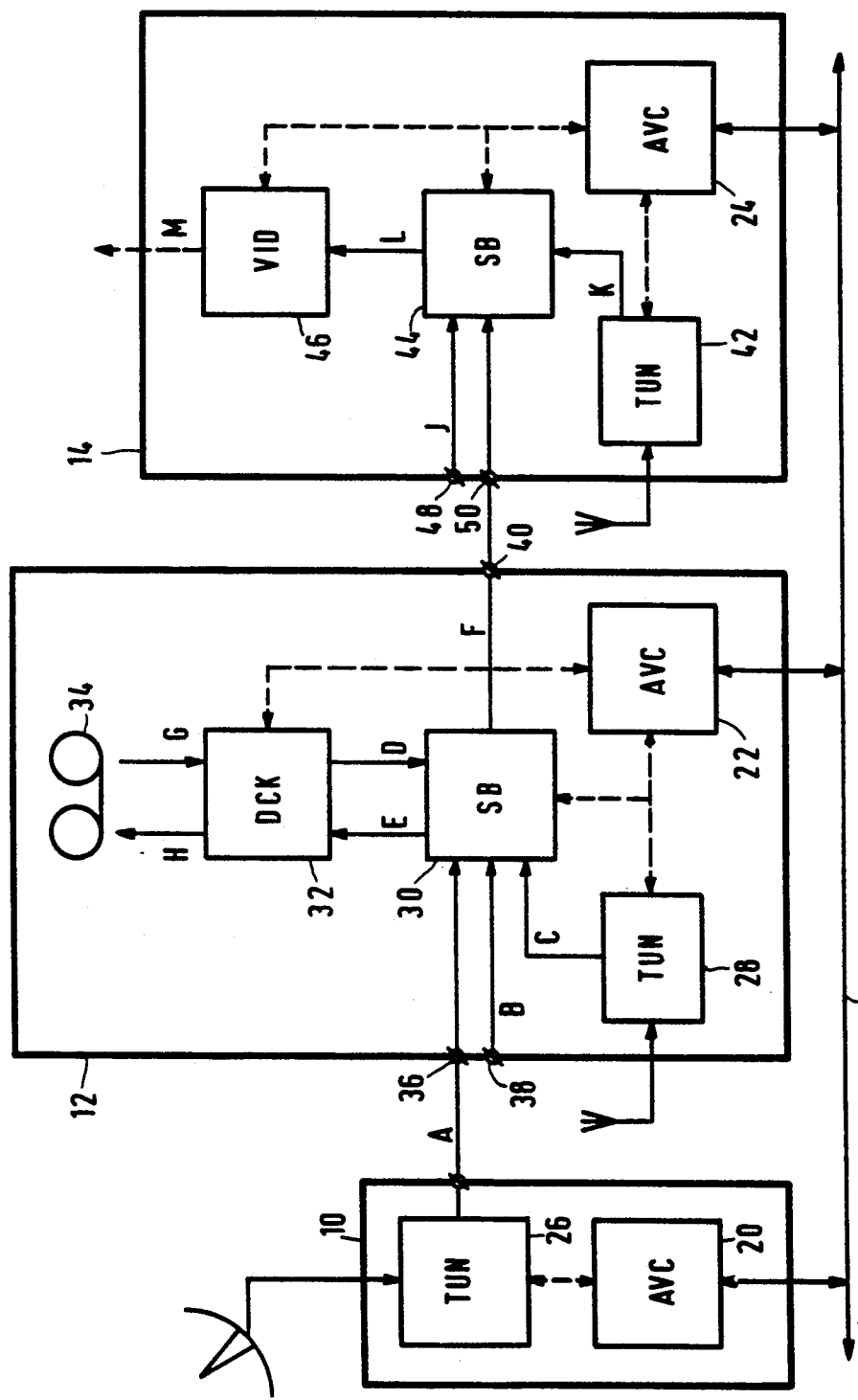
FIG. 1 shows a domestic video entertainment system.

FIG. 1 shows a domestic video entertainment system comprising a satellite broadcast tuner 10, a video cassette recorder (VCR) 12 and a television receiver 14, all connected to a serial data bus 16. Video and audio signals are passed within and between the devices 10,12,14 using, for example, SCART (Euroconnector) plugs, sockets and multiwire cables.

The serial data bus is in this embodiment a Domestic Digital Bus (D2B) as standardised by the International Electrotechnical Commission (IEC), Geneva, to be published in their document number 1030 and previously available in draft form. D2B provides for distributed control of the bus, and allows commands and other messages to be uniquely addressed for specific "devices", such as the apparatuses 10,12 and 14, and also for specific "subdevices" within each device.

Within each device 10,12,14 there are shown blocks representing D2B subdevices. The division of a device into subdevices is necessary only in a logical sense, that is to say, from the point of view of its behaviour relative to the D2B bus 16. In the physical implementation of the device, there may or may not be corresponding separate physical subdevices. In fact, in the embodiment shown, each device includes one audio/video controller (AVC) type of subdevice, 20, 22 and 24 respectively, which provides the control and systematic interrogation intelligence for all subdevices within that device, relaying D2B messages to and from those subdevices as indicated by the dotted data paths in FIG. 1. Often, the control logic of the AVC and some or all of the other subdevices will be integrated in a single microcontroller. Subdevices not directly involved with video signals are not shown, for the sake of simplicity.

In the satellite tuner device 10, a tuner subdevice 26 (TUN) performs the signal processing functions necessary to provide baseband video signals on signal path A, while the AVC subdevice 20 receives user instructions and D2B messages and operates to select channels, keep track of preset channel selections and so forth.

The VCR device 12 includes its AVC subdevice 22, and also a terrestrial broadcast tuner subdevice 28 (TUN), a switchbox subdevice 30 (SB) and a videotape record/replay deck 32 (DCK). The recording medium itself is indicated at 34. The signal path A is connected via a first external (SCART) connector 36 of the VCR device to an input of the VCR's switchbox subdevice 30. A second external connector 38 of the VCR device is also connected via a signal path B to the switchbox subdevice 30, for example to allow connection of a videodisc player, or a second VCR. The terrestrial tuner subdevice 28 supplies a video signal to the switchbox 30 via a signal path C, and the deck subdevice 32 supplies a video signal to the switchbox 30 via a signal path D. The switchbox 30 supplies video signals via a signal path E to the deck 32 and via a signal path F to a third external connector 40 of the VCR 12. The processes of reading and writing signals on the tape 34, within the deck subdevice 32, are schematically represented by video signal paths G and H respectively.

The television receiver device 14 includes its AVC subdevice 24 and also a terrestrial tuner subdevice 42 (TUN), a switchbox subdevice 44 (SB) and a video monitor subdevice 46 (VID). The television receiver device 14 has two external (SCART) connectors 48 and 50 for supplying video signals to the switchbox 44. The connector 48 forms part of an unused video signal path J, while the connector 50 is connected to the third external connector 40 of the VCR 12, and thus the video signal path F extends from an output of the switchbox 30 in the VCR to an input of the switchbox 44 in the television receiver device 14. A video signal output of the tuner subdevice 42 is connected to further input of the switchbox 44 to form a signal path K. A first video signal output of the switchbox 44 is connected to an input of the video monitor subdevice 46 (signal path L).

In operation, the tuner subdevices 26,28 and 42 can be regarded as sources of video signals within the system. The video monitor subdevice 46 can act as a destination for video signals, and functions to display images to the user, as indicated by the dotted output path M. The record/reply deck subdevice 32 can act as a source and/or a destination of video signals, depending whether it is playing and/or recording at a given time.

Since the functional units of the apparatus 10,12,14 are addressable as D2B subdevices, any of the AVC subdevices 20,22,24 can take control of the bus and address commands to those subdevices. This is done for example by an AVC subdevice which has received a user command and requires control of subdevices in other devices to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 30 and 44 can be controlled via the bus (or by its associated AVC subdevice) to connect its output data paths(s) a specified one of its input data paths. For example, if a user indicates to the television receiver device 10 that it is desired to watch a certain satellite broadcast channel, suitably addressed and coded D2B messages can be sent via the bus 16 to ensure that the satellite tuner 10, VCR 12 and the television 14 are active, to cause the satellite tuner 10 to select the appropriate channel, to cause the VCR switchbox 30 to connect signal path A to signal path F, and to cause the television switch box 44 to connect signal path F to signal path L. There are many ways of arranging these events with or without user intervention. For greatest user-friendliness, the whole process can be controlled by the AVC subdevice of the device which receives the user input. The information necessary for building the signal path from A to L can be obtained by a suitable series of D2B request messages to the relevant devices and subdevices. A suitable system for providing such control is described in GB-A1-2 223 114 (PHN 12678). In that system no AVC subdevice requires knowledge of the complete system, only its nearest neighbours.

Video signals can be broadcast in a variety of aspect ratios, including for example, the normal aspect ratio of 4:3 and the widescreen aspect ratio of 16:9. Furthermore, it is possible to convert widescreen signals to 4:3 signals for display on a 4:3 monitor screen. The MAC/-packet standard signals defined in the European Broadcasting Union document Tech. 3258-E provide for data bits defining the aspect ratio to be transmitted as part of the broadcasting signal. In this way, a subdevice can know what aspect ratio is being received. In other cases, the aspect ratio might be defined simply by the knowledge that a connected subdevice is only capable of generating one aspect ratio.

Suppose now that the satellite tuner device 10 can receive widescreen signals (16:9), and that the satellite tuner subdevice 26 has the facility to convert 16:9 signals to normal (4:3) signals before generating its output video signal on path A. Suppose further that the VCR device 12 is only suitable for processing (recording and replaying) normal 4:3 signals and includes no aspect ratio conversion facility, but that the television receiver device 14 (more specifically the video monitor subdevice 46 therein) can display 16:9 pictures and can convert a received 4:3 signal to 16:9 for display.

In a conventional system the satellite tuner device 10 might permanently, or at least by default, convert received 16:9 signals to 4:3 signals, which would suit the VCR in any event. The video monitor subdevice 14, on the other hand, can detect that it is receiving 4:3 signals and convert them to 16:9 for display. This is as it should be if the signal source is 4:3, but it would be very undesirable to have 16:9 signals converted in the tuner subdevice 28 to 4:3 and then converted back to 16:9 by the video monitor subdevice 46, since picture size and/or resolution would be irretrievably lost. Some means of selectively disabling the aspect ratio conversion in one or both of the subdevices 26 and 46 is therefore desirable which is responsive to the exact operations being performed at a given time, and to the capabilities of the device involved. Rather than place this burden on the user of the system, the system of FIG. 1 uses the serial bus 16 to achieve automatic and optimum operation of aspect ratio conversion facilities.

For this purpose, certain commands and requests are defined that can be transmitted as D2B messages between D2B subdevices that make up the signal path from source to destination, and the various subdevices' responses to these messages are also defined. The requests are designed to enable a subdevice to find out: (1) what is the aspect ratio of a given signal; (2) what are the aspect ratio capabilities of a given product in the system; (3) can a given product convert aspect ratios; and (4) is the product presently converting aspect ratios? With questions (1) and (2), it can be determined whether aspect ratio conversion is required. With questions (3) and (4), it can be determined where in the system the conversion facilities exist for implementing the required conversion. Question (4) can also reveal when too many conversions are occurring, as in the example mentioned above.

For video processing subdevices the following D2B messages (always addressed to the specific subdevice) are now defined:

[Aspect Ratio In?] is a request to which the addressed subdevice replies [4:31] or [16:91] indicating the aspect ratio of the current input signal of the subdevice (for example the signal or path E for the deck subdevice 32). In the case of a source type of subdevice, (for example 26,28 or 42) which is not normally considered as having an input for D2B purposes, the reply indicates the aspect ratio of the received signal, before any conversion.

[Aspect Ratio Out?] is a request to which the addressed subdevice replies [4:31] or [16:91], indicating the aspect ratio of the current output signal of that subdevice (for example A for subdevice 26, D for subdevice 32). For a destination type of subdevice, which is not normally considered to have an output for D2B purposes, the reply indicates the aspect ratio after any conversion, for example the screen aspect ratio (path M) for video monitor subdevice 46.

For a source/destination type of subdevice, for example a pay-television decoder (not shown), the meanings of the [. . . In?] and [. . . Out?] requests are self-explanatory, the guiding principle in all cases being that, if aspect ratio conversion can occur in a subdevice, then [. . . In?] and [. . . Out?] refer to the video signals before and after conversion respectively.

For deck/player subdevices, such as the deck subdevice 32 of VCR 12, aspect ratio conversion could occur in the recording process and/or in the replay process. For this reason, the signal paths H and G to and from the recording medium 34 are involved, and two further requests are defined:

[Medium Aspect Ratio In?] causes the subdevice to reply [4:31] or [16:91], according to the aspect ratio of signals being recorded (path H); while

[Medium Aspect Ratio Out?] causes the subdevice to reply [4:31] or [16:91] according to the aspect ratio of the signals being replayed from the recording medium, (path G).

In order that an AVC subdevice can find out where conversion can be performed in the system, two further requests are defined:

[Aspect Ratio Conversion?] asks the addressed subdevice whether conversion is presently occurring between the [. . . In] and [. . . Out] signal paths or, in the special case of a deck/player type subdevice, whether conversion is occurring in the replay process (between G and D for subdevice 32); and

[Recorded Aspect Ratio Conversion?] asks, in the special case of a deck/player subdevice, whether conversion is occurring in the recording process (between E and H).

The reply to each of these requests can be one of the following:

[Not Implemented] indicates that aspect ratio conversion is not available;

[ON] indicates that conversion is available and is currently enabled (the direction of conversion can be determined using the [Aspect Ratio Out? ] request);

[OFF] indicates that conversion is available, but is currently disabled.

Using all of the requests defined above, one subdevice can find out the answers to questions (1),(2),(3) and (4) above, either directly or by inference from a combination of requests and replies. In order that one subdevice can use this information to control the aspect ratio conversion facilities, a command pair is defined:

[Aspect Ratio Conversion ON] enables conversion when available in the addressed subdevice or, in the special case of a deck/replay subdevice, in the replay process (G to D); and

[Aspect Ratio Conversion Off] disables such conversion. A further command pair:

[Recorded Aspect Ratio Conversion On] and

[Recorded Aspect Ratio Conversion Off] enable and disable respectively conversion in the recording process (E to H) of a deck/player type subdevice, if available.

Each of these commands is effective to override any automatic or default setting of the aspect ratio conversion facility, at least until the signal path or channel selection changes. Having defined this set of commands and requests, the system is able to operate in accordance with the invention to implement aspect ratio conversion strictly as necessary and in an optimum and user friendly manner.

Figure 2:
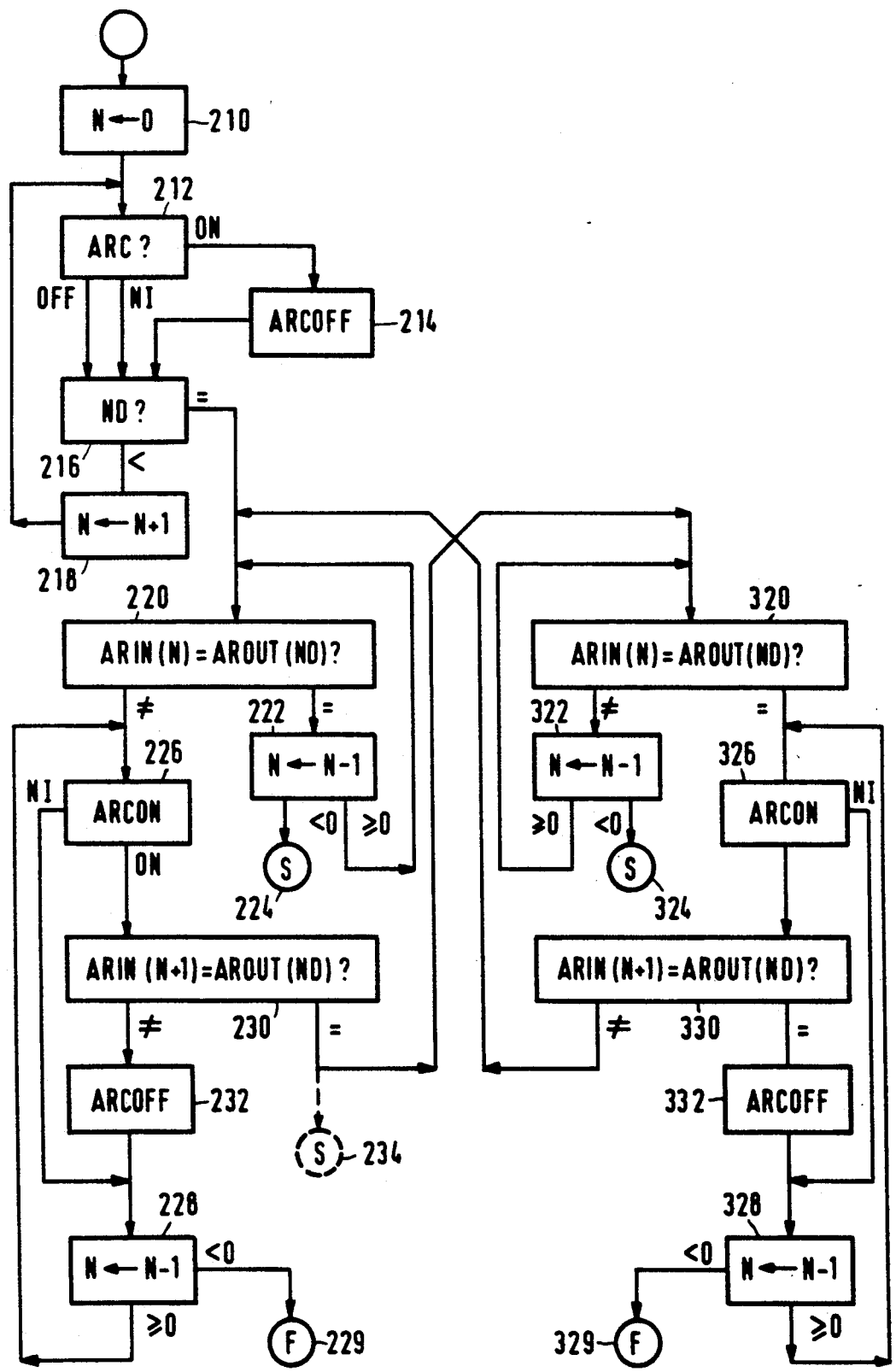
FIG. 2 is a flowchart illustrating the operation of the system of FIG. 1 in accordance with the present invention.

FIG. 2 is a flowchart representing one possible method of achieving optimised conversion. The execution of the method can be controlled by any one of the AVC subdevices, acting as a master for the duration of the method, or it can be controlled in a distributed manner so that, for example, each AVC subdevice need only store information about itself and its neighbours in the signal path. It is assumed that a traceable signal path has been established from a source subdevice to a destination subdevice, which may have been done automatically by use of the method described in GB-A-2 223 114 (PHN 12678). For the path to be traceable, it is only necessary that each subdevice in the path should know who are its nearest neighbours in the path although a single controller could obtain knowledge of the complete path if it is so desired.

For the purposes of this description, the subdevices forming the complete signal path are identified by an index N, where N=0 for the source subdevice, N=ND for the destination subdevice and N=1,2 ... (ND-1) for the subdevices in between. Of course, in the execution of the method in practice, the subdevices are identified by their unique device/subdevice addresses, as defined in the D2B standard.

The flowchart begins at 210 by assigning N the value zero, thereby focussing attention on the source subdevice first of all. At 212, the request [Aspect Ratio Conversion?] is issued to the source device, which replies [OFF], [Not Implemented] ("NI" in FIG. 2) or [ON], with the meaning described above. If the reply is [ON], the command [Aspect Ratio Conversion OFF] is issued at 214, and in all cases control passes to 216 with the knowledge that no conversion is presently occurring in the source device.

At 216, N is compared with ND (in practice, the current device-subdevice address is compared with the destination device-subdevice address). If N is less than ND, N is incremented at 218 to focus attention on the next subdevice in the signal path, and control returns to 212. If N=ND, all conversion facilities in the signal path will have been disabled, and control passes to 220.

From 220 onward, the signal path is traced back from the destination (N=ND) to the source (N=0) to identify where aspect ratio conversion is necessary and where it can be done. These steps are explained below, in numerical order.

220: The input aspect ratio of subdevice N (N=ND at first) is compared with the output aspect ratio of the destination subdevice ND.

222: If equality is detected at 220, the aspect ratios of signals are compatible so far, N is decremented and control passed to 220 if N is not less than zero.

224: If N is less than zero after being decremented at 222, the method ends in success, with compatible aspect ratios throughout the signal path.

226: If inequality is detected at 220, some conversion is required. Aspect ratio conversion (if available in subdevice N) is enabled by a command to subdevice N.

228: If aspect ratio conversion is not implemented in subdevice N (which situation may be known already from step 212, or discovered anew at 226), N is decremented and control returned to 226 until a subdevice with a conversion facility is found.

229: If N is decremented below zero at 228, then no suitable conversion facility is implemented between source and destination, and the methods ends in failure.

230: If conversion is successfully enabled at 226, compare the input aspect ratio of subdevice N+1 with the destination aspect ratio. This test is skipped in the case of the destination subdevice ND.

232: If the conversion enabled at 226 has not resulted in equality at 230 (the enabled conversion facility may be in the wrong direction), it is disabled again and control passed to 228 (see above) to continue the search for a suitable conversion facility.

234: If equality is detected at 230, then the conversion enabled at 226 has successfully cured the incompatibility of aspect ratios previously detected at 220. On the assumption that no more than one conversion will ever be required in a signal path, the process ends in (assumed) success.

If it cannot be safely assumed that no more than one conversion will be necessary, control passes instead to steps 320 to 332. These steps correspond exactly to the like-numbered steps 220 to 232 just described, but with equality and inequality interchanged at 320 and 330. If a second conversion is not required, then the method will ultimately end in success at 324. If a second conversion is required and is successfully enabled at 326, control will pass to 220 once more.

The method of FIG. 2 is thus effective to ensure that conversion is effected when necessary, but with a strategy aimed at performing conversion as late in the signal path as possible, and never more times than are necessary. Other methods for implementing this strategy, and indeed other strategies, are possible, as will be apparent to the person skilled in the art.

By way of illustration, consider the method of FIG. 2 applied to a signal path from the satellite tuner subdevice 26 to the video monitor subdevice 46 in the system of FIG. 1, that is to say the path comprising the paths A, F and L. Recall that subdevices 26 and 46 can convert from 16:9 to 4:3 and from 4:3 to 16:9 respectively. It is assumed that switchbox subdevices are transparent to signals of any aspect ratio, and the aspect ratio and commands and requests may therefore be considered inapplicable to subdevices 30 and 44. The subdevices 26 and 46 are therefore indexed by the values of N=0 and 1 respectively, with ND=1.

The method of FIG. 2 may be executed entirely under control of the AVC subdevice 20 of the satellite tuner device 10, for example in response to a request to display a particular (widescreen) broadcast on the television screen (subdevice 46). With N=0,1 the controller ensures at 210–218 that the aspect ratio conversion facilities in the tuner subdevice 26 and video monitor subdevice are disabled, overriding their existing states and any default settings.

With N=1=ND, the video monitor subdevice 46 is asked at 220 whether its input aspect ratio matches the output aspect ratio (16:9) of the destination subdevice (also 46). Since a widescreen signal is currently being received and the conversion facility in the tuner subdevice is disabled, equality is detected and control passes via 222 back to 220, this time with N=0. Since the signal received by the tuner from the satellite is a widescreen signal, equality is detected again. At 222, N is already zero, so the method terminates at 224 with no conversions enabled, which is as it should be.

Suppose now that with with the same signal path established, the user selects a new channel on the tuner subdevice 26, and the new signal has a 4:3 aspect ratio. The AVC subdevice 20 allows for this and executes the method of FIG. 2 once more. This time, with both conversion facilities disabled, inequality is detected at 220 with N=1, and at 226 conversion from 4:3 to 16:9 is enabled in the video monitor subdevice 46. With N=1 still, control then passes via 230 to 320. Since conversion is occurring in the destination subdevice 46, inequality is desired and detected at 320, first with N=1, then, via 322, with N=0. When N is decremented below zero at 322, the method terminates at 324 with exactly one conversion facility enabled, which conversion facility is the one furthest along in the signal path.

As a last illustration of the operation of the method, assume that the user now wishes to record a widescreen programme using the VCR device 12. This leads to the establishment of a new signal path A-E-H. Recall that the VCR device 12 is a 4:3-only device, with no facility for conversion of aspect ratios. The index values N=0 and 1 can be assigned to the subdevices 26 and 32 (recording) respectively. Again the switchbox subdevice 30 is treated as transparent.

With N=0 at 212 to 216 it is once again aspect ratio conversion is disabled in the tuner subdevice 26, the output aspect ratio of which is therefore 16:9. With N=1 at 220 it is then detected that the recorded output aspect ratio 4:3, (path H) of subdevice 32 (acting as destination) is incompatible with the current input aspect ratio (16:9) of that subdevice. Conversion cannot be enabled at 226 in the subdevice 32, so N is decremented at 228 to refer again to the tuner subdevice 26. With N=0, the conversion facility in the tuner subdevice is enabled successfully at 226 and the output aspect ratio of subdevice 26 changes to 4:3. With N=0 at 230 compatibility between the 4:3 signal now being supplied by subdevice 26 and the 4:3 signal required by subdevice 32 is detected and control passes via 320 to 322. With N=0, it is detected at 322 that subdevice 26 was in fact the source of this signal path, and the method terminates at 324.

It can be seen from these examples that the method of FIG. 2, executed for each newly established signal path, can ensure optimum activation of aspect ratio conversion facilities at all times, without user intervention. Moreover, the activation will remain optimised even if the system configuration changes, for example by the substitution of a widescreen VCR in place of the VCR 12. The requests and commands can be used by any controlling subdevice to interrogate and alter the status of the system. A user may be enabled to initiate the method of FIG. 2 or any other method as well as or instead of providing automatic initiation. The requests may also be used by a controller establishing a signal path to influence the choice of signal path to eliminate unnecessary conversions.

From reading the present disclosure, other variations will be apparent to persons skilled in the art. Such variations may involve other features which are already known in the design, manufacture and use of domestic video signal processing systems and apparatuses and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A video signal processing system comprising a plurality of video signal processing apparatuses, at least one of the apparatuses including a facility for conversion of the aspect ratio of video signals, the apparatuses being connected so as to provide a video signal path from a source one of the apparatuses to a destination one of the apparatuses, characterized in that the system further comprises control means for systematically interrogating each apparatus in the signal path to determine whether aspect ratio conversion is necessary in the signal path and for selectively enabling or disabling the or each aspect ratio conversion facility in the signal path to effect such necessary conversion.

2. A system as claimed in claim 1 wherein the control means eliminates unnecessary conversion of aspect ratio in the signal path.

3. A system as claimed in claim 1 wherein the control means delays choosing to enable conversion as late as possible in the signal path when faced with more than one available conversion facility.

4. A system as claimed in claim 1 wherein the control means includes means for transmitting predefined request and command messages to the apparatuses via a standard serial bus having distributed control.

5. A system as claimed in claim 4 wherein the predefined messages include a request for information concerning the aspect ratio of a video signal within the apparatus at a point specified in the request.

6. A system as claimed in claim 4 wherein the predefined messages include requests for information concerning the existence and state of enablement of an aspect ratio conversion facility within an apparatus or part thereof.

7. A video signal processing apparatus for use in a system as claimed in any preceding claim, the apparatus including means for initiating the systematic interrogation of connected apparatuses.

8. An apparatus as claimed in claim 7 wherein the initiating means includes means for further controlling the systematic interrogation of connected apparatuses and for selectively enabling or disabling each aspect ratio conversion facility in the signal path to effect such necessary conversion.

9. A video signal processing apparatus for use in a system as claimed in claim 4, the apparatus including an interface to standard serial bus and further including means for responding to a predefined request message received via the bus interface by transmitting a reply message identifying the aspect ratio of a video signal within the apparatus at a point specified in the request message.

10. An apparatus as claimed in claim 9 including means for responding to a predefined request message received via the bus interface by transmitting a reply message indicating whether an aspect ratio conversion facility exists within the apparatus or a specified part thereof and if so whether the facility is currently enabled or disabled.

11. A system as claimed in claim 2 wherein the control means delays choosing to enable conversion as late as possible in the signal path when faced with more than one available conversion facility.

12. A system as claimed in claim 2 wherein the control means includes means for transmitting predefined request and command messages to the apparatuses via a standard serial bus having distributed control.

13. A system as claimed in claim 11 wherein the control means includes means for transmitting predefined request and command messages to the apparatuses via a standard serial bus having distributed control.

14. A system as claimed in claim 5 wherein the predefined messages include requests for information concerning the existence and state of enablement of an aspect ratio conversion facility within an apparatus or part thereof.

15. A video signal processing apparatus for use in a system as claimed in claim 14, the apparatus including means for initiating the systematic interrogation of connected apparatuses to determine whether aspect ratio conversion is necessary in a signal path.

16. An apparatus as claimed in claim 15 wherein the initiating means includes means for further controlling the systematic interrogation of connected apparatuses and for selectively enabling or disabling each aspect ratio conversion facility in the signal path to effect such necessary conversion.

17. A video signal processing apparatus for use in a system as claimed in claim 5, the apparatus including an interface to a standard serial bus and further including means for responding to a predefined request message received via the bus interface by transmitting a reply message identifying the aspect ratio of a video signal within the apparatus at a point specified in the request message.

18. A video signal processing apparatus for use in a system as claimed in claim 6, the apparatus including an interface to a standard serial bus and further including means for responding to a predefined request message received via the bus interface by transmitting a reply message identifying the aspect ratio of a video signal within the apparatus at a point specified in the request message.

19. An apparatus as claimed in claim 17 including means for responding to a predefined request message received via the bus interface by transmitting a reply message indicating whether an aspect ratio conversion facility exists within the apparatus or a specified part thereof and if so whether the facility is currently enabled or disabled.

20. An apparatus as claimed in claim 18 including means for responding to a predefined request message received via the bus interface by transmitting a reply message indicating whether an aspect ratio conversion facility exists within the apparatus or a specified part thereof and if so whether the facility is currently enabled or disabled.

* * * * *